United States Patent Office 3,517,359
Patented June 23, 1970

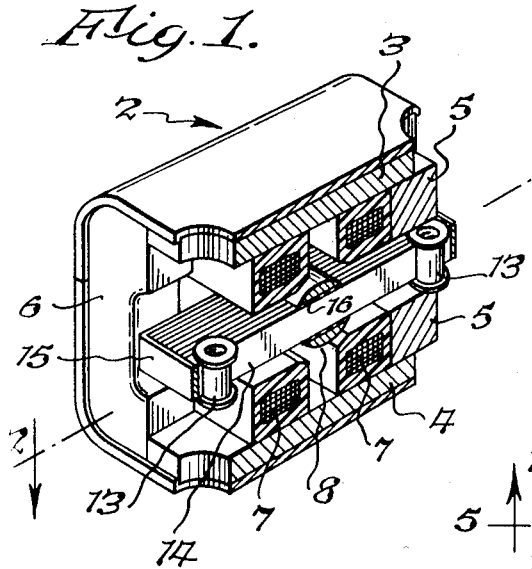
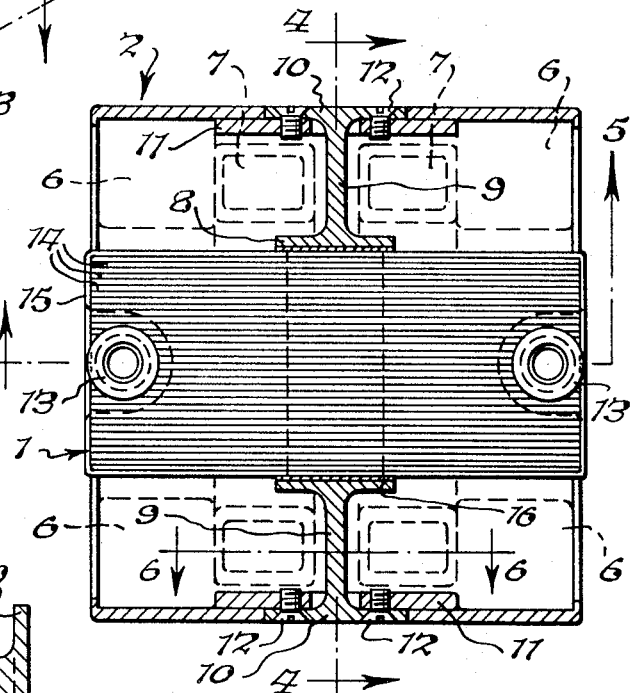
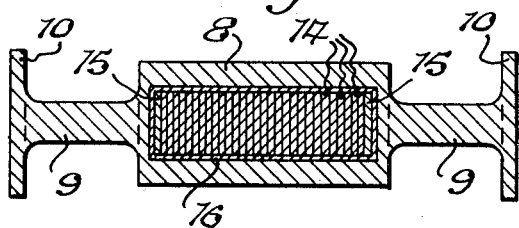
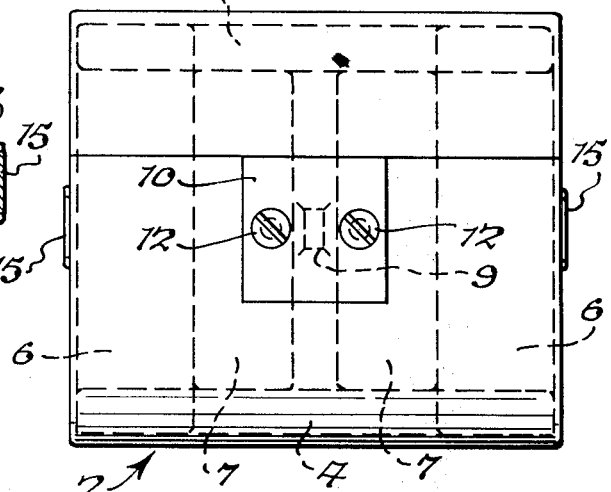
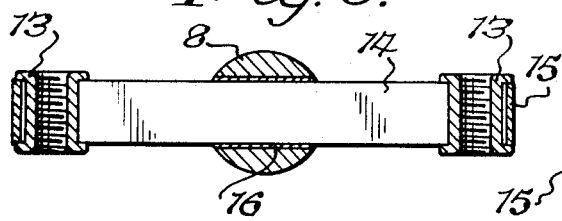
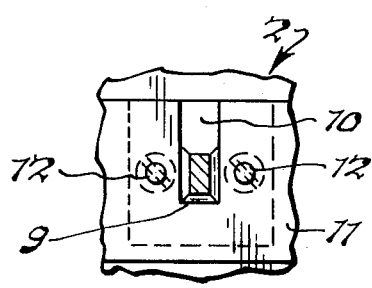
INVENTORS
NICHOLAS D. TRBOVICH
& WILLIAM H. MEYER
BY Christel & Bean
ATTORNEYS.

3,517,359
ELECTRO-MAGNETIC ACTUATOR ARMATURE ASSEMBLY
Nicholas D. Trbovich, West Seneca, and William H. Meyer, East Aurora, N.Y., assignors to Servotronics, Inc., Buffalo, N.Y.
Filed Apr. 12, 1966, Ser. No. 542,083
Int. Cl. H01f 7/08
U.S. Cl. 335—230                                              9 Claims

ABSTRACT OF THE DISCLOSURE

A torque motor armature having lamina stacked in side-by-side relation and lying in parallel planes substantially normal to the axis about which the armature oscillates. Banding means circumferentially encircle the opposite ends of the armature holding the lamina against lateral spreading. The armature is mounted by a frame encircling it in a transverse plane generally normal to the plane of the armature, with torsion spring mounting arms extending laterally from the frame on opposite sides of the armature to mounting plates, carried by the motor housing. The arms are integral with the frame and with the mounting plates, comprising therewith a one-piece unitary construction.

---

This invention relates generally to electro-magnetic actuators of the type known as torque motors, and more specifically to a new and useful armature construction and mounting arrangement for such torque motors.

It is known that the output of torque motor armatures can be increased by increasing the number of ampere turns in the control coils and/or increasing the mass of the magnetic materials. However, this is accomplished by a slower response rate. Where rapidity of response and armature travel and force are critical, this poses a problem.

Accordingly, a primary object of our invention is to provide a torque motor capable of a significantly greater output force and travel than heretofore available, with no significant decrease in rate of response.

Another object of our invention is to provide a torque motor capable of a faster response rate, greater output force and greater armature travel than heretofore obtainable in a relatively small and lightweight construction.

In one aspect thereof a torque motor constructed in accordance with our invention is characterized by the provision of an armature mounted for oscillation about an axis, the armature comprising lamina stacked in parallel planes substantially normal to the axis, and means holding the lamina against spreading apart adjacent the opposite ends of the armature.

The foregoing and other objects, advantages and characterizing features of the torque motor of our invention will become clearly apparent from the ensuing detailed description of an illustrative embodiment thereof taken with the accompanying drawing showing the same, wherein like reference numerals denote like parts throughout the various views, and wherein:

FIG. 1 is a longitudinal sectional view, in perspective, showing half of a torque motor of our invention, the pole pieces at the left-hand end being omitted for greater clarity;

FIG. 2 is a sectional view of the complete motor, on an enlarged scale, taken about on line 2—2 of FIG. 1, the field magnets and coils being indicated in broken outline for greater clarity;

FIG. 3 is a view thereof in side elevation;

FIGS. 4 and 5 are transverse and longitudinal sectional views thereof taken about on lines 4—4 and 5—5, repectively, of FIG. 2; and FIG. 6 is a fragmentary detail view taken about on line 6—6 of FIG. 2.

Referring now in detail to the illustrative embodiment depicted in the accompanying drawing, there is shown a torque motor of our invention comprising an armature, generally designated 1, mounted on a housing 2 by means to be described for oscillation about a transverse axis. Housing 2 is conveniently fabricated in two generally U-shaped parts welded together. A magnetic circuit is provided, comprising top and bottom shunts 3 and 4, respectively of magnetic material extending between paired pole pieces 5 of magnetic material at opposite ends of the armature, only the right hand pair being shown in FIG. 1. Permanent magnets 6 are provided on each side of each pair of pole pieces 5, and field control coils 7 are provided around opposite halves of armature 1 for varying the relative flux acting on the opposite ends thereof. Coils 7 are encapsulated in epoxy resin or other suitable insulating material. Such magnetic circuits and their operation are well known (see, for example, the article "Small Displacement Electromechanical Actuators," by Nicholas D. Trbovich, appearing in Military Systems Design for January–February 1960, published by Instruments Publishing Company, Pittsburgh 12, Pa.), and therefore require no further description here.

Armature 1 is mounted in housing 2 by means including a frame 8 encircling the armature mid-way between its ends. Torsion spring arms 9 extend from frame 8 to mounting plates 10. The opposite side walls of the lower part of housing 2 are cut out, to receive plates 10 in the plane thereof, the upper part of housing 2 extending across the cut-outs. Bracket plates 11 are welded or otherwise secured to the inner walls of housing 2, and mounting plates 10 are fastened thereto as by screws 12. Thus, armature 1 is mounted for oscillatory movement of its opposite ends toward and away from pole pieces 5, and power take off attachments in the form of internally threaded grommets 13 are mounted in the opposite ends of armature 1.

It is a particular feature of our invention that armature 1 is not the usual solid member of magnetic material. Instead, we provide a laminated armature comprising stacked lamina 14 of magnetic material. Lamina 14 are arranged side by side, lying in parallel planes normal to the axis of rotation, and are bonded together with an insulating adhesive such as an epoxy resin. We have discovered that, with such a laminated construction, an unexpected increase is obtained in the force available for power take-off at the opposite ends of the armature. The driving force produced at the opposite end of the armature, with a given number of ampere turns in control field coils 7, is substantially greater. Alternatively, we have discovered that with a laminated armature construction, the same output force can be obtained with a substantial decrease in the ampere turns in control coils 7, and a faster response thereby is obtained.

In addition to the foregoing, we have discovered that a substantial increase in travel can be obtained at the outer ends of the armature, without sacrificing force or response rate, if the armature is laminated as shown.

By way of example, by utilizing a laminated armature construction we have been able to increase the output force of a given size of torque motor by 50%, with no increase in input current, to reduce the time constant by more than 50%, and to double the travel of the armature ends.

Thus, a startling improvement in torque motor performance is obtained by utilizing a laminated armature construction. In addition, a reduction in armature weight is available with a laminated construction. However, such a construction presents certain problems the solution to which is another important feature of this invention. For example, the lamina tend to splay and spread apart in reaction to the power take-off at the armature ends. To prevent this, we bind the armature lamina with a peripheral band 15 which extends along the opposite sides of the armature and across the opposite ends thereof. In the illustrated embodiment, band 15 is continuous and extends through frame 8. Band 15 effectively holds the lamina 14 against spreading, and is bonded to the stacked lamina by an insulating adhesive.

A band 16 (FIGS. 4 and 5) of paper, fiberglass or other suitable insulating material transversely encircles armature 1 within frame 8, to avoid short circuiting the lamina.

It is another feature of our invention that a torque motor of superior performance is obtained in a small package. This is particularly important in missiles, rockets and wherever space is at a premium. To this end, it is desired to obtain the requisite torsional restraint in arms 9 of minimum length. This poses a problem, because such arms customarily are brazed at their opposite ends, and undesirable stresses in addition to altering the original heat treatment properties of the material result from the heat produced by such brazing when the spring arms are not long enough to effectively dissipate such heat.

This problem is solved with our invention wherein the armature mounting is a one-piece construction. Thus, as clearly seen in FIGS. 2 and 4, spring arms 9 are formed integral with the central, armature receiving frame 8 and with the mounting plates 10. By forming the arms 9 in one piece with frame 8 and plates 10, brazing heats and the resulting stresses and original heat treat alternations are avoided, and a durable and dependable torsion arm mounting is provided.

In addition, it will be noted that torsion arms are thicker in the direction normal to the plane of armature 1 than in the lengthwise direction of the armature. This reinforces the armature against central displacement by the force of reaction to the power take off at the armature ends, while retaining the desired torsion spring action. However, cylindrical or other torsion arm configurations can be used where the foregoing is not a problem.

Accordingly, it is seen that our invention fully accomplishes its intended objects. The foregoing detailed description is intended to be illustrative only, with the scope of our invention being defined by the appended claims.

Having fully disclosed and completely described our invention, and its mode of operation, what we claim as new is:

1. In a torque motor, an armature, mounting means engaging said armature and mounting said armature for oscillation about an axis, said armature comprising lamina stacked in side-by-side relation, said lamina lying in parallel planes substantially normal to said axis, and means holding said lamina against lateral spreading apart adjacent the opposite ends of said armature, wherein said holding means comprise banding means circumferentially encircling said opposite ends of said armature.

2. A torque motor as set forth in claim 1, wherein said mounting means engage said armature intermediate the opposite ends thereof.

3. A torque motor as set forth in claim 2, together with power take-off means adjacent said opposite ends of said armature.

4. In a torque motor, an armature, mounting means engaging said armature and mounting said armature for oscillation about an axis, said armature comprising lamina stacked in side-by-side relation, said lamina lying in parallel planes substantially normal to said axis, and means holding said lamina against lateral spreading apart adjacent the opposite ends of said armature, wherein said mounting means comprise a frame encircling said armature in a transverse plane generally normal to the plane of said armature, torsion spring mounting arms extending laterally from said frame on opposite sides of said armature, a housing for said motor, and mounting plate means carried by said arms and secured to said housing, said arms being integral with said frame and with said mounting plate means and comprising therewith a one-piece unitary construction.

5. A torque motor as set forth in claim 4, wherein said spring arms are thinner in the lengthwise direction of said armature than in the direction of said transverse plane.

6. In a torque motor, an armature, mounting means engaging said armature and mounting said armature for oscillation about an axis, said armature comprising lamina stacked in side-by-side relation, said lamina lying in parallel planes substantially normal to said axis, and means holding said lamina against lateral spreading apart adjacent the opposite ends of said armature, wherein said mounting means engage said armature intermediate the opposite ends thereof, together with a housing, magnetic pole piece means on opposite sides of said armature adjacent both of said opposite ends thereof, said armature moving toward and away from said pole piece means upon oscillation of said armature about said axis, permanent magnet means associated with said pole piece means and with said armature for creating a magnetic circuit therethrough, electromagnetic means associated with said armature for altering said magnetic circuit, and mechanical power take-off means carried by said armature adjacent said opposite ends thereof, said means holding said lamina against spreading apart comprising banding means circumferentially encircling said armature, and said mounting means comprising a frame transversely encircling said armature and said banding means, torsion spring arms extending from said frame on opposite sides of said armature, and mounting plate means carried by said arms and secured to said housing, said arms being integral with said frame and said plate means as a unitary construction therewith, and said arms being thicker in a transverse plane normal to said armature than in the lengthwise direction of said armature, said lamina being substantially magnetically insulated from each other and from said frame.

7. A torque motor as set forth in claim 6, wherein said housing has opposite side walls cut out to receive said mounting plate means in the plane of said housing walls.

8. A torque motor as set forth in claim 6, wherein said housing is in two parts, one of said housing parts having opposite side walls cut out to receive said mounting plate means in the plane of said housing walls, the other of said housing parts extending across the cut-outs, and bracket plates secured to said housing walls interiorly of said housing, said mounting plate means being fastened to said bracket plates.

9. A torque motor as set forth in claim 1, wherein said mounting means comprise a frame encircling said armature in a transverse plane generally normal to the plane of said armature, torsion spring mounting arms extending laterally from said frame on opposite sides of said armature, a housing for said motor, and mounting plate means carried by said arms and secured to said housing.

References Cited

UNITED STATES PATENTS

| | | | |
|---|---|---|---|
| 1,646,234 | 10/1927 | Creed | 335—230 |
| 2,860,289 | 11/1958 | Verardo | 310—29 XR |
| 2,962,611 | 11/1960 | Atchley | 310—29 |

GEORGE HARRIS, Primary Examiner

U.S. Cl. X.R.

335—279; 310—29

UNITED STATES PATENT AND TRADEMARK OFFICE
CERTIFICATE OF CORRECTION

PATENT NO. : 3,517,359
DATED : June 23, 1970
INVENTOR(S) : Nicholas D. Trbovich and William H. Meyer It is certified that error appears in the above-identified patent and that said Letters Patent are hereby corrected as shown below:

Introductory information, Column 1:

"Nicholas D. Trbovich, West Seneca and
William H. Meyer, East Aurora, N.Y.,
assignors to Servotronics, Inc., Buffalo,
N.Y."
      should be changed to --Nicholas D. Trbovich, West Seneca and
William H. Meyer, East Aurora, N.Y.;
said Meyer assignor to Servotronics, Inc.,
Buffalo, N.Y.--

Signed and Sealed this seventeenth Day of February 1976

[SEAL]

Attest:

RUTH C. MASON
Attesting Officer

C. MARSHALL DANN
Commissioner of Patents and Trademarks